US012639278B2

(12) United States Patent
Dany et al.

(10) Patent No.: US 12,639,278 B2
(45) Date of Patent: May 26, 2026

(54) SYSTEM AND METHOD FOR IMPLEMENTING A MODEL DRIVEN DATA PLATFORM WITH NO CODE OR LOW CODE DATA WAREHOUSE

(71) Applicant: JPMorgan Chase Bank, N.A., New York, NY (US)

(72) Inventors: Nissim Nathan Dany, Roseland, NJ (US); Venkat Aedavelli, Frisco, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/239,534

(22) Filed: Aug. 29, 2023

(65) Prior Publication Data

US 2025/0077493 A1    Mar. 6, 2025

(51) Int. Cl.
*G06F 16/21* (2019.01)
*G06F 21/60* (2013.01)

(52) U.S. Cl.
CPC .......... *G06F 16/219* (2019.01); *G06F 21/604* (2013.01); *G06F 2221/2101* (2013.01); *G06F 2221/2113* (2013.01)

(58) Field of Classification Search
CPC ................. G06F 16/219; G06F 21/604; G06F 2221/2101; G06F 2221/2113
See application file for complete search history.

(56) References Cited

U.S. PATENT DOCUMENTS

| | | | | |
|---|---|---|---|---|
| 6,684,222 | B1 * | 1/2004 | Cornelius | ............... G06F 16/30 |
| 9,164,738 | B2 * | 10/2015 | Boyersmith | ............ G06F 16/83 |
| 10,824,634 | B2 * | 11/2020 | Siebel | ......................... G06F 9/54 |
| 11,012,318 | B2 * | 5/2021 | Rieke | .................... H04L 43/028 |
| 11,032,320 | B1 * | 6/2021 | Reyero | .............. G06F 16/2465 |
| 11,294,924 | B1 * | 4/2022 | Talbot | ................. G06F 3/04842 |
| 11,853,980 | B2 * | 12/2023 | Hundling | ............. G06Q 20/065 |
| 12,222,896 | B1 * | 2/2025 | de Gaia | ................ G06F 16/125 |
| 2011/0004612 | A1 * | 1/2011 | Boyersmith | .......... G06F 16/284 |
| | | | | 707/769 |
| 2013/0013552 | A1 * | 1/2013 | Eshleman | ............. G06F 16/254 |
| | | | | 707/812 |

(Continued)

*Primary Examiner* — Raquel Perez-Arroyo
*Assistant Examiner* — Jessica N Le
(74) *Attorney, Agent, or Firm* — GREENBLUM & BERNSTEIN, P.L.C.

(57) ABSTRACT

Various methods and processes, apparatuses/systems, and media for systemically and dynamically onboarding and reporting data with no code or low code data warehouse are disclosed. A processor implements a model driven data WaaS and reporting platform; receives data from a plurality of data source systems; provisions the data received from the plurality of source systems; validates the provisioned data; creates a machine learning data model based on the validated data; onboards the data model onto the model driven data WaaS and reporting platform; and generates an adapter pattern on every field type to treat it as a field. The adapter pattern is generated where fields and their types are entered into data WaaS field types so that a user can define the field once and use across all reports thereby enabling no code approach. The processor then dynamically generates a report corresponding to the adapter pattern for publication and consumption.

18 Claims, 10 Drawing Sheets

(56)     References Cited

U.S. PATENT DOCUMENTS

| | | | |
|---|---|---|---|
| 2015/0112969 A1* | 4/2015 | Prabhu | G06F 16/26 |
| | | | 707/722 |
| 2015/0206207 A1* | 7/2015 | Narasimhan | H04L 67/1004 |
| | | | 705/400 |
| 2019/0342229 A1* | 11/2019 | Khinvasara | H04L 41/0896 |
| 2021/0150489 A1* | 5/2021 | Haramati | G06F 16/252 |
| 2021/0366586 A1* | 11/2021 | Ryan | G06Q 20/3224 |
| 2022/0067048 A1* | 3/2022 | Mohan | G06F 16/24564 |
| 2022/0113949 A1* | 4/2022 | Geoffroy | G06F 8/36 |
| 2022/0237202 A1* | 7/2022 | Orun | G06F 16/254 |
| 2023/0114277 A1* | 4/2023 | Deshmukh | G06Q 10/063112 |
| | | | 705/7.14 |
| 2023/0177481 A1* | 6/2023 | Motlagh | H04L 63/104 |
| | | | 705/51 |
| 2023/0273905 A1* | 8/2023 | Carru | G06F 16/212 |
| | | | 726/28 |
| 2023/0297550 A1* | 9/2023 | Kumar | G06F 16/258 |
| | | | 707/756 |
| 2023/0297554 A1* | 9/2023 | Borchmann | G06F 16/86 |
| | | | 707/802 |
| 2023/0393832 A1* | 12/2023 | Touati | H04L 67/10 |
| 2023/0401181 A1* | 12/2023 | Gnanaprakasam | |
| | | | G06F 21/6245 |
| 2024/0134873 A1* | 4/2024 | Mehta | G06F 16/337 |
| 2024/0134874 A1* | 4/2024 | Blonski | G06N 3/045 |
| 2024/0427741 A1* | 12/2024 | Li | G06F 16/21 |
| 2025/0047711 A1* | 2/2025 | Rai | H04L 63/20 |

* cited by examiner

500a

| _record_id | _record_ts | attribute_1 | attribute_2 | attribute_3 | scd_hash | scd_rec_start_dttm | scd_rec_end_dttm | scd_is_active_rec |
|---|---|---|---|---|---|---|---|---|
| 1001 | 2022-10-01 10:10:10 | a1 | b1 | 100 | a0d24a225b920fe | 2022-10-01 10:10:10 | 2999-12-31 23:59:59 | true |
| 1002 | 2022-10-01 10:10:10 | a2 | b2 | 101 | a7481f37934042 | 2022-10-01 10:10:10 | 2999-12-31 23:59:59 | true |

| _record_id | _record_ts | attribute_1 | attribute_2 | attribute_3 | scd_hash | scd_record_dttm | scd_record_end_dttm | scd_is_active_rec |
|---|---|---|---|---|---|---|---|---|
| 1001 | 2022-10-01 10:10:10 | a1 | b1 | 100 | a0d24a225b920 | 2022-10-01 10:10:10 | 2999-12-31 23:59:59 | true |
| 1002 | 2022-10-01 10:10:10 | a2 | b2 | 101 | a7481f37934042 | 2022-10-01 10:10:10 | 2022-10-02 10:10:10 | false |
| 1002 | 2022-10-02 10:10:10 | aa2 | bb2 | 101 | c56297268942e | 2022-10-22 10:10:10 | 2999-12-31 23:59:59 | true |
| 1003 | 2022-10-02 10:11:10 | a3 | b3 | 91 | 636cced03701a | 2022-10-02 10:11:10 | 2999-12-31 23:59:59 | true |

SYSTEM AND METHOD FOR IMPLEMENTING A MODEL DRIVEN DATA PLATFORM WITH NO CODE OR LOW CODE DATA WAREHOUSE

TECHNICAL FIELD

This disclosure generally relates to data processing, and, more particularly, to methods and apparatuses for implementing a platform, language, cloud, and database agnostic model driven data platform with no code or low code data warehouse.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence (BI) tools. For instance, software has been directed to performance analysis, report generation, project tracking, and competitive analysis, to name but a few. In general, large enterprises, corporations, agencies, institutions, and other organizations are facing a continuing problem of handling, processing, and/or accurately describing a vast amount of data that are crucial to plan actions in an efficient and expedited manner.

For example, identity management, also known as Identity and Access Management (JAM), is a framework of policies and technologies to ensure that the right users have the appropriate access to technology resources. In delivering reports (e.g., IAM reports) at scale, conventional approach involves bespoke logic and engineering for each new report, which may prove to be manually intensive, time consuming, and error prone. For example, an SOC (System and Organization Controls) 1 report may focus on outsourced services that could impact a company's financial reporting. By providing a SOC 1 report from a third-party, companies may effectively communicate information about their risk management and controls framework to multiple stakeholders. However, audit nature of the IAM domain may require time consuming SOC1 approval for each report. Moreover, there may be a situation for data duplication and duplicate efforts (bespoke warehouses) by each domain area for reports.

Thus, there is a need for an advanced method and tools that can address these conventional shortcomings corresponding to data reports.

SUMMARY

The present disclosure, through one or more of its various aspects, embodiments, and/or specific features or sub-components, provides, among other features, various systems, servers, devices, methods, media, programs, and platforms for implementing a platform, language, cloud, and database agnostic model driven data platform module configured to systemically and dynamically: onboard modeled data into a data Warehouse as a Service (WaaS) platform; implement pattern driven low/no-code data pipeline and ingestion mechanisms; generate platform managed data change history data; allow point-in-time queries for audit and regulatory workloads; generate scalable, secure, cost effective and performant reports; allow sharing data for data science, analytics and reporting, etc., create a single platform for accessing and consuming historical view of all IAM data (e.g., audit, analytics, etc.), but the disclosure is not limited thereto.

According to exemplary embodiments, a method for data onboarding and reporting with no code or low code data warehouse by utilizing one or more processors along with allocated memory is disclosed. The method may include: implementing a model driven data WaaS and reporting platform; establishing a communication link between the model driven data WaaS and reporting platform and a plurality of data source systems via a communication interface; receiving data from said plurality of data source systems; provisioning the data received from the plurality of source systems; validating the provisioned data; creating a machine learning data model based on the validated data; onboarding the data model onto the model driven data WaaS and reporting platform; generating an adapter pattern on every field type to treat it as a field, wherein the adapter pattern is generated where fields and their types are entered into data WaaS field types so that a user can define the field once and use across all reports thereby enabling no code approach; and dynamically generating a report corresponding to the adapter pattern for publication and consumption.

According to exemplary embodiments, the method may further include: generalizing the field by extracting common properties from the data within the data model, wherein the common properties include one or more of the following data: field identifier label, placeholder text, display order, and attribute that defines the number of columns a cell should span.

According to exemplary embodiments, the method may further include: implementing the adapter pattern in a manner such that the model driven data WaaS and reporting platform implements low-code or no-code data pipeline and ingestion mechanisms for: generating platform managed data change history data; allowing point-in-time queries for audit and regulatory workloads; generating scalable, secure, cost effective and performant reports; sharing data for data science, analytics and reporting all from a single platform as provided by the model driven data WaaS and reporting platform.

According to exemplary embodiments, the method may further include: implementing role based access control mechanisms; and providing access to the report according to user's role.

According to exemplary embodiments, the method may further include: generating a dynamic reporting application programming interface; and downloading the report by utilizing the dynamic reporting application programming interface.

According to exemplary embodiments, the method may further include: generating a dynamic reporting user interface; and downloading the report by utilizing the dynamic reporting user interface.

According to exemplary embodiments, the method may further include: maintaining, upon onboarding the data model, data change history to any dataset by the model driven data platform module without any effort from data producers.

According to exemplary embodiments, the method may further include: creating corresponding field type at runtime utilizing the adapter pattern.

According to exemplary embodiments, a system for data onboarding and reporting with no code or low code data warehouse is disclosed. The system may include: a processor; and a memory operatively connected to the processor via a communication interface, the memory storing computer readable instructions, when executed, may cause the processor to: implement a model driven data WaaS and reporting platform; establish a communication link between the model driven data WaaS and reporting platform and a plurality of data source systems via a communication interface; receive data from said plurality of data source systems; provision the data received from the plurality of source systems; validate the provisioned data; create a machine learning data model based on the validated data; onboard the data model onto the model driven data WaaS and reporting platform; generate an adapter pattern on every field type to treat it as a field, wherein the adapter pattern is generated where fields and their types are entered into data WaaS field types so that a user can define the field once and use across all reports thereby enabling no code approach; and dynamically generate a report corresponding to the adapter pattern for publication and consumption.

According to exemplary embodiments, the processor may be further configured to: generalize the field by extracting common properties from the data within the data model, wherein the common properties include one or more of the following data: field identifier label, placeholder text, display order, and attribute that defines the number of columns a cell should span.

According to exemplary embodiments, the processor may be further configured to: implement the adapter pattern in a manner such that the model driven data WaaS and reporting platform implements low-code or no-code data pipeline and ingestion mechanisms for: generating platform managed data change history data; allowing point-in-time queries for audit and regulatory workloads; generating scalable, secure, cost effective and performant reports; sharing data for data science, analytics and reporting all from a single platform as provided by the model driven data WaaS and reporting platform.

According to exemplary embodiments, the processor may be further configured to: implement role based access control mechanisms; and provide access to the report according to user's role.

According to exemplary embodiments, the processor may be further configured to: generate a dynamic reporting application programming interface; and download the report by utilizing the dynamic reporting application programming interface.

According to exemplary embodiments, the processor may be further configured to: generate a dynamic reporting user interface; and download the report by utilizing the dynamic reporting user interface.

According to exemplary embodiments, the processor may be further configured to: maintain, upon onboarding the data model, data change history to any dataset by the model driven data platform module without any effort from data producers.

According to exemplary embodiments, the processor may be further configured to: create corresponding field type at runtime utilizing the adapter pattern.

According to exemplary embodiments, a non-transitory computer readable medium configured to store instructions for data onboarding and reporting with no code or low code data warehouse is disclosed. The instructions, when executed, may cause a processor to perform the following: implementing a model driven data WaaS and reporting platform; establishing a communication link between the model driven data WaaS and reporting platform and a plurality of data source systems via a communication interface; receiving data from said plurality of data source systems; provisioning the data received from the plurality of source systems; validating the provisioned data; creating a machine learning data model based on the validated data; onboarding the data model onto the model driven data WaaS and reporting platform; generating an adapter pattern on every field type to treat it as a field, wherein the adapter pattern is generated where fields and their types are entered into data WaaS field types so that a user can define the field once and use across all reports thereby enabling no code approach; and dynamically generating a report corresponding to the adapter pattern for publication and consumption.

According to exemplary embodiments, the instructions, when executed, may cause the processor to further perform the following: generalizing the field by extracting common properties from the data within the data model, wherein the common properties include one or more of the following data: field identifier label, placeholder text, display order, and attribute that defines the number of columns a cell should span.

According to exemplary embodiments, the instructions, when executed, may cause the processor to further perform the following: implementing the adapter pattern in a manner such that the model driven data WaaS and reporting platform implements low-code or no-code data pipeline and ingestion mechanisms for: generating platform managed data change history data; allowing point-in-time queries for audit and regulatory workloads; generating scalable, secure, cost effective and performant reports; sharing data for data science, analytics and reporting all from a single platform as provided by the model driven data WaaS and reporting platform.

According to exemplary embodiments, the instructions, when executed, may cause the processor to further perform the following: implementing role based access control mechanisms; and providing access to the report according to user's role.

According to exemplary embodiments, the instructions, when executed, may cause the processor to further perform the following: generating a dynamic reporting application programming interface; and downloading the report by utilizing the dynamic reporting application programming interface.

According to exemplary embodiments, the instructions, when executed, may cause the processor to further perform the following: generating a dynamic reporting user interface; and downloading the report by utilizing the dynamic reporting user interface.

According to exemplary embodiments, the instructions, when executed, may cause the processor to further perform the following: maintaining, upon onboarding the data model, data change history to any dataset by the model driven data platform module without any effort from data producers.

According to exemplary embodiments, the instructions, when executed, may cause the processor to further perform the following: creating corresponding field type at runtime utilizing the adapter pattern.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 5A illustrates an exemplary table implemented by the platform, language, database, and cloud agnostic model driven data platform module of FIG. 4 for data mapping using a model in accordance with an exemplary embodiment.

FIG. 5B illustrates another exemplary table implemented by the platform, language, database, and cloud agnostic model driven data platform module of FIG. 4 for managing change data in accordance with an exemplary embodiment.

DETAILED DESCRIPTION

Figure 1:
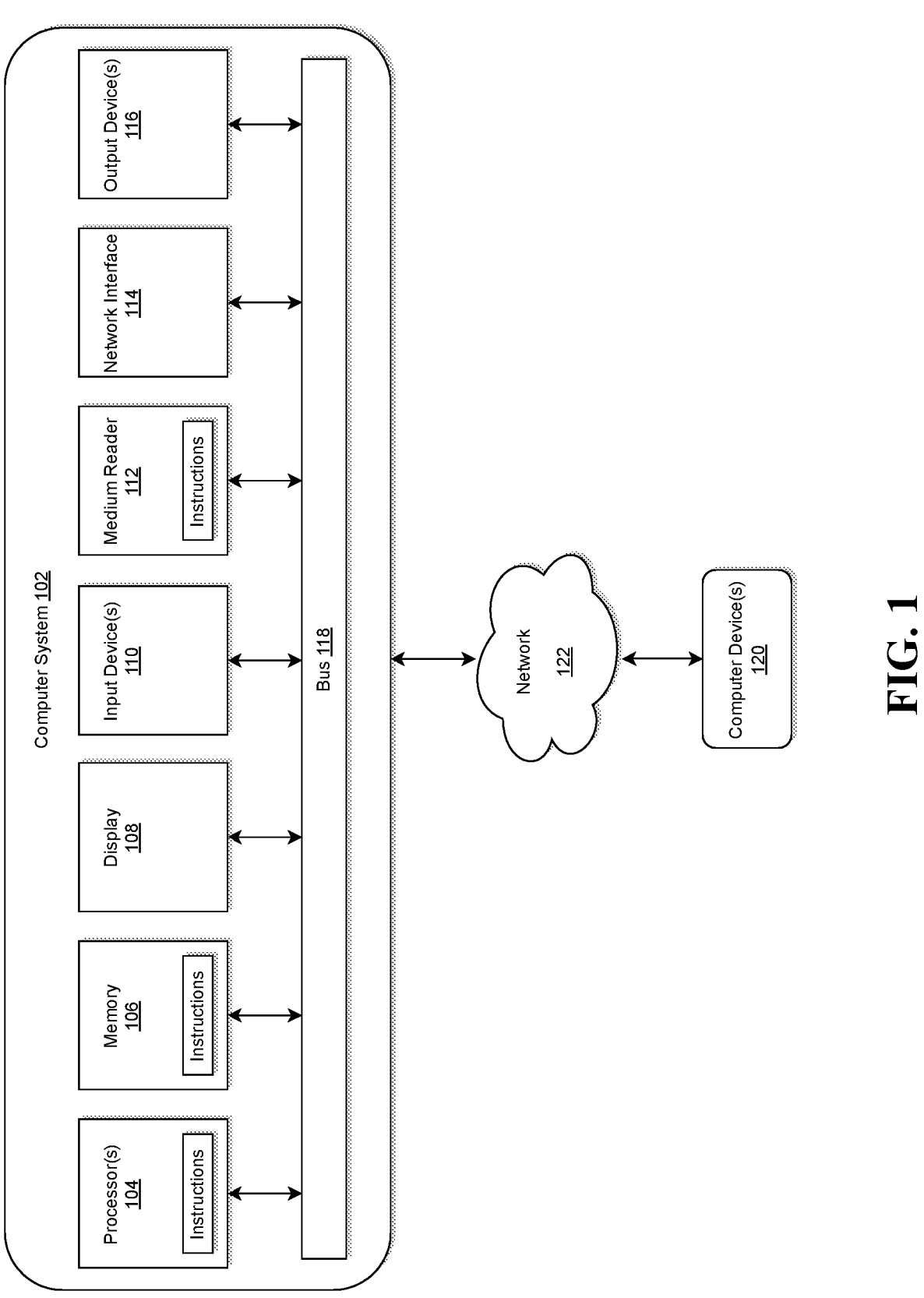
FIG. 1 illustrates a computer system for implementing a platform, language, database, and cloud agnostic model driven data platform module configured for systemic and dynamic data onboarding and reporting with no code or low code data warehouse in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform, language, database, and cloud agnostic model driven data platform module configured to automatically and dynamically data onboarding and reporting with no code or low code data warehouse in accordance with an exemplary embodiment. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the model driven data platform module implemented by the system 100 may be platform, language, database, and cloud agnostic that may allow for consistent easy orchestration and passing of data through various components to output a desired result regardless of platform, browser, language, database, and cloud environment. Since the disclosed process, according to exemplary embodiments, is platform, language, database, browser, and cloud agnostic, the model driven data platform module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

The present disclosure, through one or more of its various aspects, embodiments, and/or specific features or sub-components, provides within system 100, among other features, various systems, servers, devices, methods, media, programs, and platforms for implementing a platform, language, cloud, and database agnostic model driven data platform module with no code or low code data warehouse configured to systemically and dynamically implement logical data models focusing on business concepts thereby ensuring consistent data representation across various platforms, including on-premise and off-premise solutions, but the disclosure is not limited thereto.

For example, the present disclosure, through one or more of its various aspects, embodiments, and/or specific features or sub-components, also provides within system 100, among other features, various systems, servers, devices, methods, media, programs, and platforms for implementing a platform, language, cloud, and database agnostic model driven data platform module with no code or low code data warehouse configured to reduce the risk of control gaps and cost to maintain by allowing business partners to more easily provide specifications without concern for the implementation and allowing for implementation changes without affecting the business facing API, but the disclosure is not limited thereto.

Moreover, the present disclosure, through one or more of its various aspects, embodiments, and/or specific features or sub-components, also provides within system 100, among other features, various systems, servers, devices, methods, media, programs, and platforms within system for implementing a platform, language, cloud, and database agnostic model driven data platform module with no code or low code data warehouse configured to provide data users, including technology and clients, to construct accurate queries when the model they interface with mirrors the business, but the disclosure is not limited thereto.

Figure 2:
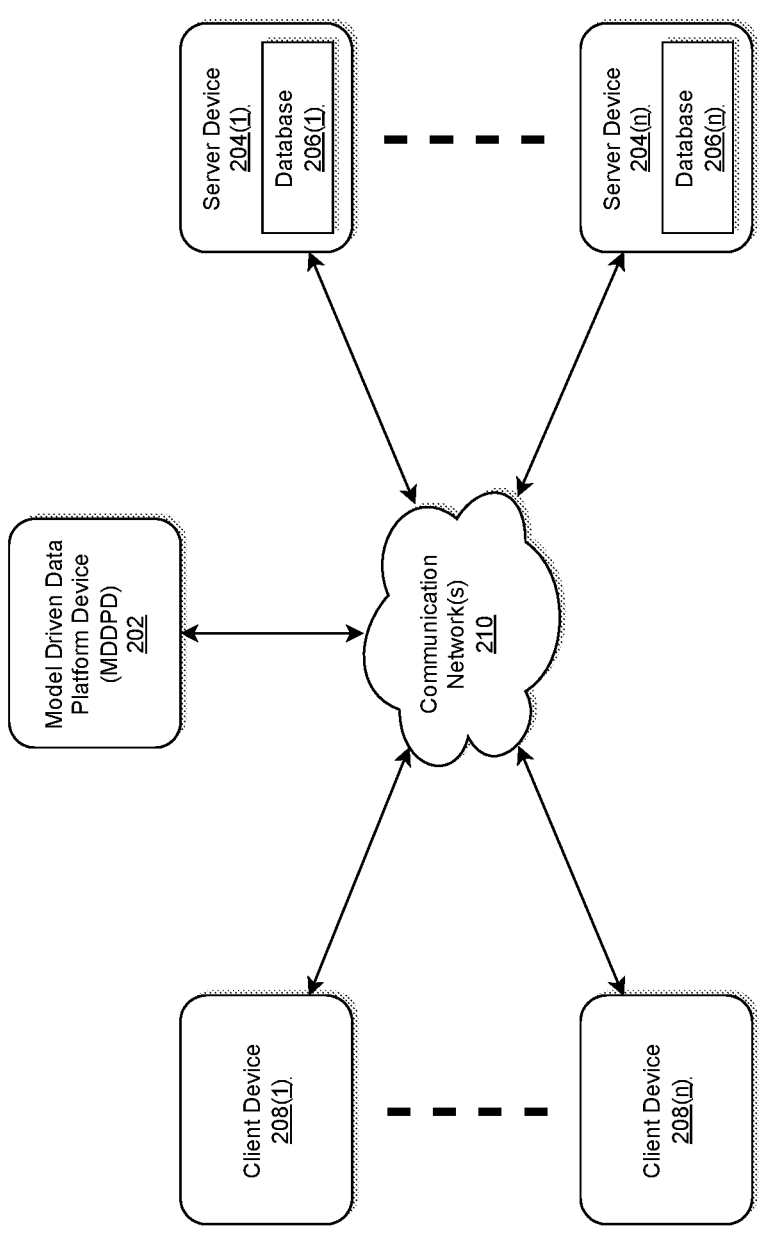
FIG. 2 illustrates an exemplary diagram of a network environment with a platform, language, database, and cloud agnostic model driven data platform device in accordance with an exemplary embodiment.

Referring to FIG. 2, a schematic of an exemplary network environment 200 for implementing a language, platform, database, and cloud agnostic model driven data platform device (MDDPD) of the instant disclosure is illustrated.

According to exemplary embodiments, the above-described problems associated with conventional tools may be overcome by implementing an MDDPD 202 as illustrated in FIG. 2 that may be configured for implementing a platform, language, database, and cloud agnostic model driven data platform module configured to systemically and dynamically onboarding and reporting data with no code or low code data warehouse, but the disclosure is not limited thereto.

The MDDPD 202 may have one or more computer system 102s, as described with respect to FIG. 1, which in aggregate provide the necessary functions.

The MDDPD 202 may store one or more applications that can include executable instructions that, when executed by the MDDPD 202, cause the MDDPD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the MDDPD 202 itself, may be located in virtual server(s) running in a cloud-based computing environment rather than being tied to one or more specific physical network computing devices. Also, the application(s) may be running in one or more virtual machines (VMs) executing on the MDDPD 202. Additionally, in one or more embodiments of this technology, virtual machine(s) running on the MDDPD 202 may be managed or supervised by a hypervisor.

In the network environment 200 of FIG. 2, the MDDPD 202 is coupled to a plurality of server devices 204(1)-204(n) that hosts a plurality of databases 206(1)-206(n), and also to a plurality of client devices 208(1)-208(n) via communication network(s) 210. A communication interface of the MDDPD 202, such as the network interface 114 of the computer system 102 of FIG. 1, operatively couples and communicates between the MDDPD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MDDPD 202, the server devices 204(1)-204 (n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The MDDPD 202 may be a standalone device or integrated with one or more other devices or apparatuses, such as one or more of the server devices 204(1)-204(n), for example. In one particular example, the MDDPD 202 may be hosted by one of the server devices 204(1)-204(n), and other arrangements are also possible. Moreover, one or more of the devices of the MDDPD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204(n) in this example may process requests received from the MDDPD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206 (n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technol-ogy disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the MDDPD 202 that may efficiently provide a platform for implementing a platform, language, database, and cloud agnostic model driven data platform module configured to automatically and dynamically onboarding and reporting data with no code or low code data warehouse, but the disclosure is not limited thereto.

The client devices 208(1)-208(n) may run interface applications, such as standard web browsers or standalone client applications, which may provide an interface to communicate with the MDDPD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the MDDPD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the MDDPD 202, the server devices 204(1)-204(n), or the client devices 208(1)-208(n), for example, may be configured to operate as virtual instances on the same physical machine. For example, one or more of the MDDPD 202, the server devices 204(1)-204 (n), or the client devices 208(1)-208(n) may operate on the same physical device rather than as separate devices communicating through communication network(s) 210. Additionally, there may be more or fewer MDDPDs 202, server devices 204(1)-204(n), or client devices 208(1)-208(n) than illustrated in FIG. 2. According to exemplary embodiments, the MDDPD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
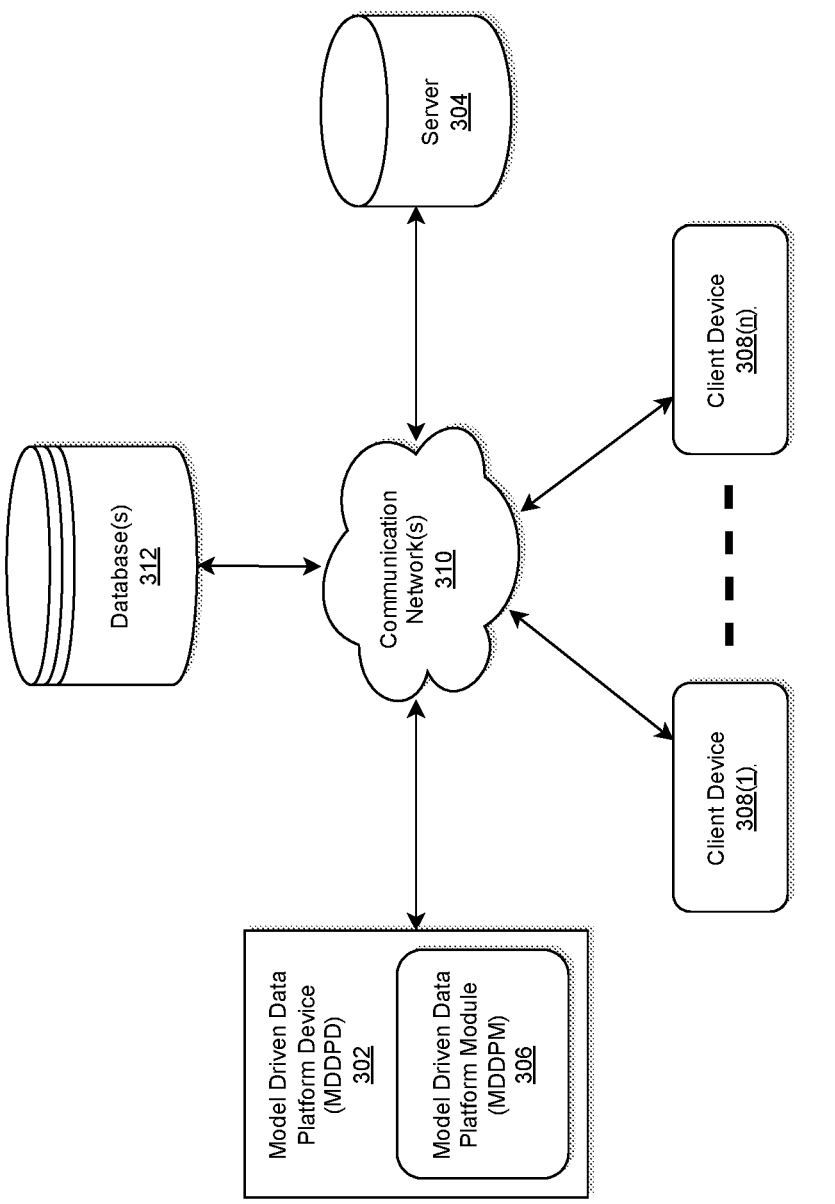
FIG. 3 illustrates a system diagram for implementing a platform, language, database, and cloud agnostic model driven data platform device having a platform, language, database, and cloud agnostic model driven data platform module in accordance with an exemplary embodiment.

FIG. 3 illustrates a system diagram for implementing a platform, language, and cloud agnostic MDDPD having a platform, language, database, and cloud agnostic model driven data platform module (MDDPM) in accordance with an exemplary embodiment.

As illustrated in FIG. 3, the system 300 may include an MDDPD 302 within which an MDDPM 306 is embedded, a server 304, a database(s) 312, a plurality of client devices 308(1) . . . 308(n), and a communication network 310.

According to exemplary embodiments, the MDDPD 302 including the MDDPM 306 may be connected to the server 304, and the database(s) 312 via the communication network 310. The MDDPD 302 may also be connected to the plurality of client devices 308(1) . . . 308(n) via the communication network 310, but the disclosure is not limited thereto.

According to exemplary embodiment, the MDDPD 302 is described and shown in FIG. 3 as including the MDDPM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) 312 may be a mainframe database, a log database that may produce programming for searching, monitoring, and analyzing machine-generated data via a web interface, etc., but the disclosure is not limited thereto. In addition, the database(s) 312 may store the large code bases models as directed graphs and graph metrics and graph centrality measures.

According to exemplary embodiments, the MDDPM 306 may be configured to receive real-time feed of data from the plurality of client devices 308(1) . . . 308(n) and secondary sources via the communication network 310.

As may be described below, the MDDPM 306 may be configured to: implement a model driven data WaaS and reporting platform; establish a communication link between the model driven data WaaS and reporting platform and a plurality of data source systems via a communication interface; receive data from said plurality of data source systems; provision the data received from the plurality of source systems; validate the provisioned data; create a machine learning data model based on the validated data; onboard the data model onto the model driven data WaaS and reporting platform; generate an adapter pattern on every field type to treat it as a field, wherein the adapter pattern is generated where fields and their types are entered into data WaaS field types so that a user can define the field once and use across all reports thereby enabling no code approach; and dynamically generate a report corresponding to the adapter pattern for publication and consumption, but the disclosure is not limited thereto.

The plurality of client devices 308(1) . . . 308(n) are illustrated as being in communication with the MDDPD 302. In this regard, the plurality of client devices 308(1) . . . 308(n) may be "clients" (e.g., customers) of the MDDPD 302 and are described herein as such. Nevertheless, it is to be known and understood that the plurality of client devices 308(1) . . . 308(n) need not necessarily be "clients" of the MDDPD 302, or any entity described in association therewith herein. Any additional or alternative relationship may exist between either or both of the plurality of client devices 308(1) . . . 308(n) and the MDDPD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the MDDPD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The MDDPD 302 may be the same or similar to the MDDPD 202 as described with respect to FIG. 2, including any features or combination of features described with respect thereto.

Figure 4:
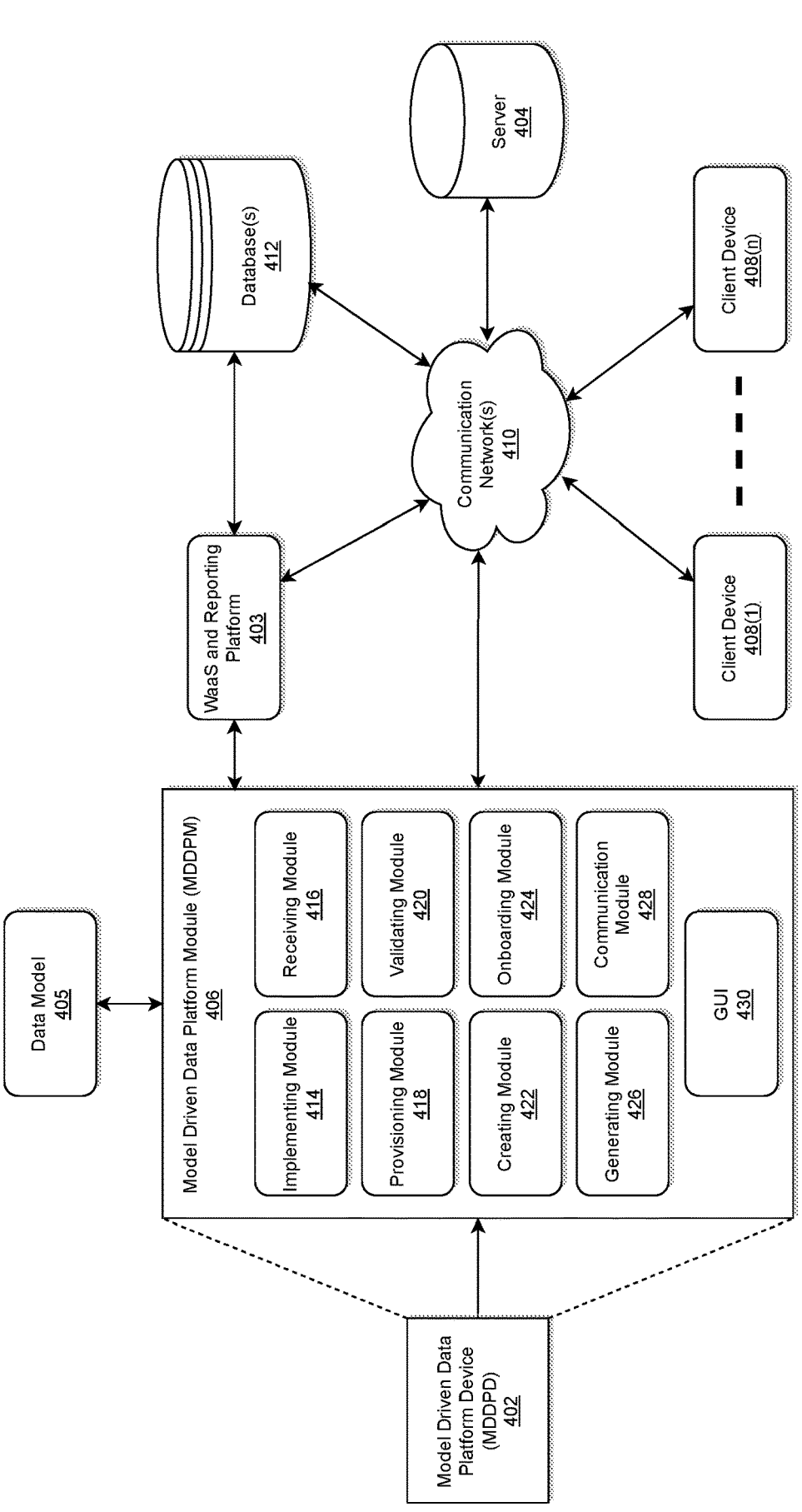
FIG. 4 illustrates a system diagram for implementing a platform, language, database, and cloud agnostic model driven data platform module of FIG. 3 in accordance with an exemplary embodiment.

FIG. 4 illustrates a system diagram for implementing a platform, language, database, and cloud agnostic MDDPM of FIG. 3 in accordance with an exemplary embodiment.

According to exemplary embodiments, the system 400 may include a platform, language, database, and cloud agnostic MDDPD 402 within which a platform, language, database, and cloud agnostic MDDPM 406 is embedded, a WaaS and reporting platform 403, a server 404, database(s) 412, and a communication network 410. According to exemplary embodiments, server 404 may comprise a plurality of servers located centrally or located in different locations, but the disclosure is not limited thereto.

According to exemplary embodiments, the MDDPD 402 including the MDDPM 406 may be connected to the server 404, the WaaS and reporting platform 403 and the database(s) 412 via the communication network 410. The MDDPD 402 may also be connected to the plurality of client devices 408(1)-408(n) via the communication network 410, but the disclosure is not limited thereto. The MDDPM 406, the server 404, the plurality of client devices 408(1)-408(n), the database(s) 412, the communication network 410 as illustrated in FIG. 4 may be the same or similar to the MDDPM 306, the server 304, the plurality of client devices 308(1)-308(n), the database(s) 312, the communication network 310, respectively, as illustrated in FIG. 3.

According to exemplary embodiments, the present disclosure, through one or more of its various aspects, embodiments, and/or specific features or sub-components, provides, among other features, various systems, servers, devices, methods, media, programs, and platforms for implementing the platform, language, cloud, and database agnostic MDDPM 406 to systemically and dynamically: onboard low/no-code report; provide role based access controls; result quicker time to market to enable new reports; generate data field types (adapter pattern—adapter is a structural design pattern that allows objects with incompatible interfaces to collaborate); provide improved UI and report execution performance; allow download via dynamic reporting service UI or API; create a single platform for access controls, access certifications, accessing and consuming historical view of all IAM data (e.g., audit, analytics, etc.), role based access controls, internal audit, etc., but the disclosure is not limited thereto.

Moreover, the present disclosure, through one or more of its various aspects, embodiments, and/or specific features or sub-components, also provides, among other features, various systems, servers, devices, methods, media, programs, and platforms for implementing the platform, language, cloud, and database agnostic MDDPM 406 that is configured to provide the following benefits to data producers: allowing data producers to model once and upon publishing data onto the model driven data platform module, the model driven data platform module automatically and dynamically generates reports without any effort from the data producers; maintaining data change history to any dataset by the model driven data platform module without any effort from data producers; directing data consumers to the model driven data platform module since data has already been published thereby freeing up resources at data producers' side and focusing on their own application domain and not worrying about reporting and data sharing; no cloud application provisioning, no database to handle for reporting, etc., but the disclosure is not limited thereto.

Additionally, the present disclosure, through one or more of its various aspects, embodiments, and/or specific features or sub-components, also provides, among other features, various systems, servers, devices, methods, media, programs, and platforms for implementing the platform, language, cloud, and database agnostic MDDPM 406 that is configured to provide the following benefits to data consumers: a single platform for IAM data; join between datasets according to needs (because they are modeled and catalogued), etc., but the disclosure is not limited thereto.

Typical reports UI involves fields, their types, validations, single select, multi select, lookup, autocomplete, order of display and titles and banners etc. However, according to exemplary embodiments, lookup, auto-complete, tags (multi-select) IAM entities, database, functional identifier, platform, application, etc. are standardized by the MDDPM 406 with a look up feature, so that user has better experience navigating them for report filters of interest.

Moreover, according to exemplary embodiments, the MDDPM 406 is configured to generalize a field by extracting the common properties, such as, field identifier label, placeholder text, display order, and attribute that defines the number of columns a cell should span etc.; write a simple adapter pattern on every field type to treat it as a field; and create any of the mentioned field type at runtime using a simple design pattern, but the disclosure is not limited thereto.

For example, the adapter pattern is generated by the MDDPM 406 where the standard tuxedo fields and their types are entered into data WaaS field types so that a user can define once and use across all reports thereby enabling no code approach. According to exemplary embodiments, by enabling the adapter pattern, the MDDPM 406 is configured to utilize UI components, backend API supported by public cloud database so that new UI objects can be generated and utilize them for reports onboarding without writing any code, but the disclosure is not limited thereto.

According to exemplary embodiments, the data generated by the inventive concepts implemented by the MDDPM 406 as disclosed herein can be shared with other downstream applications via API or data share algorithms for analytics and machine learning and business intelligence dashboards according to consumer work-load needs.

Details of the MDDPM 406 is provided below with corresponding modules.

According to exemplary embodiments, as illustrated in FIG. 4, the MDDPM 406 may include an implementing module 414, a receiving module 416, a provisioning module 418, a validating module 420, a creating module 422, an onboarding module 424, a generating module 426, a communication module 426, and a GUI 430. According to exemplary embodiments, interactions and data exchange among these modules included in the MDDPM 406 provide the advantageous effects of the disclosed invention. Functionalities of each module of FIG. 4 may be described in detail below with reference to FIGS. 4-9.

According to exemplary embodiments, each of the implementing module 414, receiving module 416, provisioning module 418, validating module 420, creating module 422, onboarding module 424, generating module 426, and the communication module 426 of the MDDPM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the implementing module 414, receiving module 416, provisioning module 418, validating module 420, creating module 422, onboarding module 424, generating module 426, and the communication module 426 of the MDDPM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the implementing module 414, receiving module 416, provisioning module 418, validating module 420, creating module 422, onboarding module 424, generating module 426, and the communication module 426 of the MDDPM 406 of FIG. 4 may be implemented by dedicated hardware, or as a combination of dedicated hardware to perform some functions and a processor (e.g., one or more programmed microprocessors and associated circuitry) to perform other functions, but the disclosure is not limited thereto. For example, the MDDPM 406 of FIG. 4 may also be implemented by Cloud based deployment.

According to exemplary embodiments, each of the implementing module 414, receiving module 416, provisioning module 418, validating module 420, creating module 422, onboarding module 424, generating module 426, and the communication module 426 of the MDDPM 406 of FIG. 4 may be called via corresponding API, but the disclosure is not limited thereto. For example, calls may also be made using Event based message interfaces in addition to APIs.

According to exemplary embodiments, the process implemented by the MDDPM 406 may be executed via the communication module 428 and the communication network 410, which may comprise plural networks as described above. For example, in an exemplary embodiment, the various components of the MDDPM 406 may communicate with the server 404, and the database(s) 412 via the communication module 428 and the communication network 410 and the results may be displayed onto the GUI 432. Of course, these embodiments are merely exemplary and are not limiting or exhaustive. The database(s) 412 may include the databases included within the private cloud and/or public cloud and the server 404 may include one or more servers within the private cloud and the public cloud.

For example, according to exemplary embodiments, the implementing module 414 may be configured to implement the model driven data WaaS and reporting platform 403. The communication module 428 may be configured to establish a communication link between the model driven data WaaS and reporting platform 403 and a plurality of data source systems (i.e., database(s) 412) via a communication interface embedded within the communication module 428. The receiving module 416 may be configured to receive data from plurality of data source systems. The provisioning module 418 may be configured to provision the data received from the plurality of source systems. The validating module 420 may be configured to validate the provisioned data. The creating module 422 may be configured to create a machine learning data model 405 based on the validated data. The onboarding module 424 may be configured to onboard the machine learning data model 405 onto the model driven data WaaS and reporting platform 403. The generating module 426 may be configured to generate an adapter pattern on every field type to treat it as a field. The adapter pattern is generated where fields and their types are entered into data WaaS field types so that a user can define the field once and use across all reports thereby enabling no code approach. The generating module 426 may be configured to dynamically generate a report corresponding to the adapter pattern for publication and consumption.

According to exemplary embodiments, the MDDPM 406 may be further configured to: generalize the field by extracting common properties from the data within the data model 405, wherein the common properties include one or more of the following data: field identifier label, placeholder text, display order, and attribute that defines the number of columns a cell should span, but the disclosure is not limited thereto.

According to exemplary embodiments, the implementing module 414 may be further configured to implement the adapter pattern in a manner such that the model driven data WaaS and reporting platform 403 implements low-code or no-code data pipeline and ingestion mechanisms for: generating platform managed data change history data; allowing point-in-time queries for audit and regulatory workloads; generating scalable, secure, cost effective and performant reports; sharing data for data science, analytics and reporting all from a single platform as provided by the model driven data WaaS and reporting platform 403.

According to exemplary embodiments, the implementing module 414 may be further configured to implement role based access control mechanisms; and provide access to the report according to user's role.

According to exemplary embodiments, the generating module 426 may be further configured to generate a dynamic reporting API; and download the report onto the GUI 430 by utilizing the dynamic reporting API.

According to exemplary embodiments, the processor may be further configured to: generate a dynamic reporting user interface; and download the report by utilizing the dynamic reporting user interface.

According to exemplary embodiments, the MDDPM 406 may be further configured to maintain, upon onboarding the data model 405, data change history to any dataset without any effort from data producers.

According to exemplary embodiments, the creating module 422 may be further configured to create corresponding field type at runtime utilizing the adapter pattern.

FIG. 5A illustrates an exemplary table 500a implemented by the platform, language, database, and cloud agnostic MDDPM 406 of FIG. 4 for data mapping using a model in accordance with an exemplary embodiment. As illustrated in FIG. 5A, the exemplary table 500a illustrates data ingestion on day 1 where the input file includes _record_id 1001,_ record_ts 2022-10-01 10:10:10, attribute_1 a1, attribute_2 b1, attribute_3 100, etc., and _record_id 1002,_record_ts 2022-10-01 10:10:10, attribute_1 a2, attribute_2 b2, attribute_3 101, etc. As illustrated in the exemplary table 500a, active SCD (Slowly Changing Dimension) for _record_id 1001 recorded as "true," and active SCD (Slowly Changing Dimension) for _record_id 1002 is also recorded as "true."

FIG. 5B illustrates another exemplary table 500b implemented by the platform, language, database, and cloud agnostic MDDPM 406 of FIG. 4 for managing change data in accordance with an exemplary embodiment. As illustrated in FIG. 5B, the exemplary table 500b illustrates data ingestion on day 2 where next cycle of SCD for same dataset are illustrated where the input file includes _record_id 1001,_ record_ts 2022-10-01 10:10:10, attribute_1 a1, attribute_2 b1, attribute_3 100, etc., _record_id 1002, _record_ts 2022-10-01 10:10:10, attribute_1 a2, attribute_2 b2, attribute_3 101, etc., _record_id 1002, _record_ts 2022-10-02 10:10:10, attribute_1 aa2, attribute_2 bb2, attribute_3 101, etc., and _ record_id 1003,_record_ts 2022-10-02 10:11:10, attribute_1 a3, attribute_2 b3, attribute_3 91, etc.

As illustrated in the exemplary table 500b of FIG. 5B, there is no entry of 1001 in the above SCD as there are no changes in SCD attributes when compared to existing attributes in the table. There is also an update and an insert for record 1002 and there is insert for record 1003. For example, active SCD for _record_id 1001 recorded as "true," active SCD for _record_id 1002 (where recorded time stamp is _ record_ts 2022-10-01 10:10:10) is recorded as "false," active SCD for _record_id 1002 (where recorded time stamp is _record_ts 2022-10-02 10:10:10) is recorded as "true," active SCD for _record_id 1003 (where recorded time stamp is _record_ts 2022-10-02 10:11:10) is also recorded as "true."

FIGS. 5A and 5B illustrate how the data model 405 is utilized to show how it is mapped 1:1. FIGS. 5A and 5B also illustrate how a sample change is managed, i.e., color coding as events come in may make it easier to summarize visually.

Figure 6:
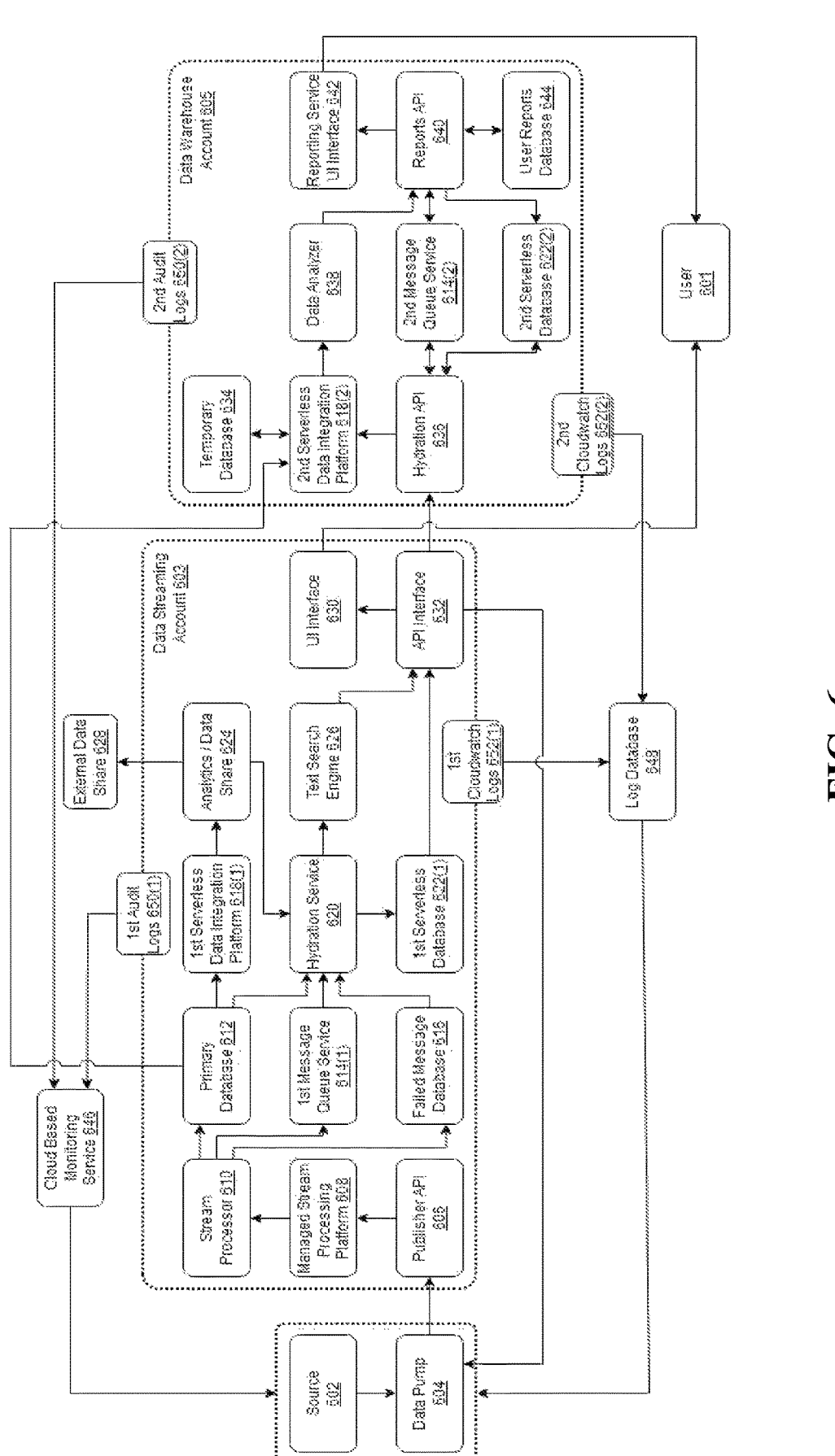
FIG. 6 illustrates an exemplary architecture diagram as implemented by the platform, language, database, and cloud agnostic model driven data platform module of FIG. 4 in accordance with an exemplary embodiment.

FIG. 6 illustrates an exemplary architecture diagram 600 as implemented by the platform, language, database, and cloud agnostic MDDPM 406 of FIG. 4 in accordance with an exemplary embodiment.

As illustrated in FIG. 6, the exemplary architecture diagram 600 includes source system (i.e., source 602, data pump 604), data streaming account 603, data warehouse account 605, and cloud based monitoring service 646. According to exemplary embodiments, the data streaming account 603, the data warehouse account 605, and the cloud based monitoring service 646 may be hosted on a private or a public cloud. The data pump 604 may allow for the selective copying of a schema or a set of tables from one database to another.

In the exemplary architecture diagram 600, according to exemplary embodiments, the data streaming account 603 may include a publisher API 606, managed stream processing platform 608, a stream processor 610, a primary database 612, first message queue service 614(1), failed message database 616, first serverless data integration platform 618 (1), a hydration service 620, first serverless database 622(1), analytics/date share 624, text search engine 626, UI interface 630, API interface 632, first audit logs 650, and first cloud watch logs 652, but the disclosure is not limited thereto.

In the exemplary architecture diagram 600, according to exemplary embodiments, the data warehouse account 605 may include temporary database 634, second serverless data integration platform 618(2), hydration API 636, data analyzer 638, reports API 640, second message queue service 614(2), reporting service UI interface 642, user reports database 644, second audit logs 650, and second cloud watch logs 652.

According to exemplary embodiments, in the exemplary architecture diagram 600, data flows in the following manner.

The data streaming account 603 utilizes the publisher API 606 to publish the data obtained from the data pump 604 received via the source 602 and the data is published onto publishing platform within the publisher API 606 block. The published data is authenticated and authorized for processing and saved onto the managed stream processing platform 608. The authenticated and authorized data flows to the stream processor 610 where the data is further processed for data payload and schema validation and persisted to the primary database 612. The processed data from the stream processor 610 also flows to the first message queue service 614(1). Invalid data from the stream processor 610 may be stored onto the failed messages database 616 for further validation processing.

According to exemplary embodiments, data from the primary database 612, the first message queue service 614 (1), and the failed message database 616 may flow to the hydration service 620 for hydrating the data and then the hydrated data may flow to the text search engine 626 for user query and completeness checks. According to exemplary embodiments, the hydrated data output from the hydration service 620 may also flow to the first serverless database 622(1) for lookup service.

Additionally, according to exemplary embodiments, the data output from the primary database 612 may flow to the first serverless data integration platform 618(1) and then flow to the analytics/data share 624 server for performing analytic and aggregation service on the data received from the primary database 612. The hydration service 620 may read aggregated data from the analytics/data share 624 server. Data hydrated to service looks ups via API (i.e., API interface 632). Output data from the analytics/data share 624 server may be sent to external data share 628 for further processing. The first audit logs 650 may be utilized for the cloud based monitoring service 646 from where the data may flow back to the source 602. The first cloud watch logs 652 may be utilized for a log database 648 to send data from the log database 648 to the data source (i.e., source 602 and data pump 604).

According to exemplary embodiments, the API interface 632 is utilized to invoke data warehouse pipeline within the data warehouse account 605 after completeness checks. Then the second serverless data integration platform 618(2) is triggered by utilizing the hydration API 636. The second serverless data integration platform 618(2) reads the data from the primary database 612. UI interface 630 may be utilized to send data from the API interface 632 received from the text search engine 626 and the first serverless database 622(1) to a user 601. The user 601 may be a client for an organization.

According to exemplary embodiments, offsets data output from the second serverless data integration platform 618(2) may be read and stored onto the temporary database 634 for further analysis. Data (i.e., bulk copy) output from the second serverless data integration platform 618(2) may be loaded onto the data analyzer 638.

According to exemplary embodiments, output data from the data analyzer 638 may be input to reports API 640 to invoke reporting service UI interface 642 for report onboarding and execution API for sending generated report to the user 601.

According to exemplary embodiments, data may flow bidirectionally: between the hydration API 636 and the second message queue service 614(2); between the second message queue service 614(2) and the reports API 640; between the hydration API 636 and the second serverless database 622(2); between the reports API and the user reports database 644; and between the second serverless data integration platform 618(2) and the temporary database 634.

According to exemplary embodiments, metadata is utilized to persist report onboarding and execution data between the reports API 640 and the second serverless database 622(2). According to exemplary embodiments, data warehouse job ingestion metadata is utilized while data is flowing between the hydration API 636 and the second serverless database 622(2). Data output from the data analyzer 638 may include report query execution results. The report query execution results may be stored onto the user reports database 644 via the reports API 640. The user 601 may retrieve the report query execution results and other generated user reports from the user reports database 644 via reporting service UI interface 642 and the reports API.

The second audit logs 650(2) may be utilized for the cloud based monitoring service 646 from where the data may flow back to the source 602. The second cloud watch logs 652(2) may be utilized for the log database 648 to send data from the log database 648 to the data source (i.e., source 602 and data pump 604).

Figure 7:
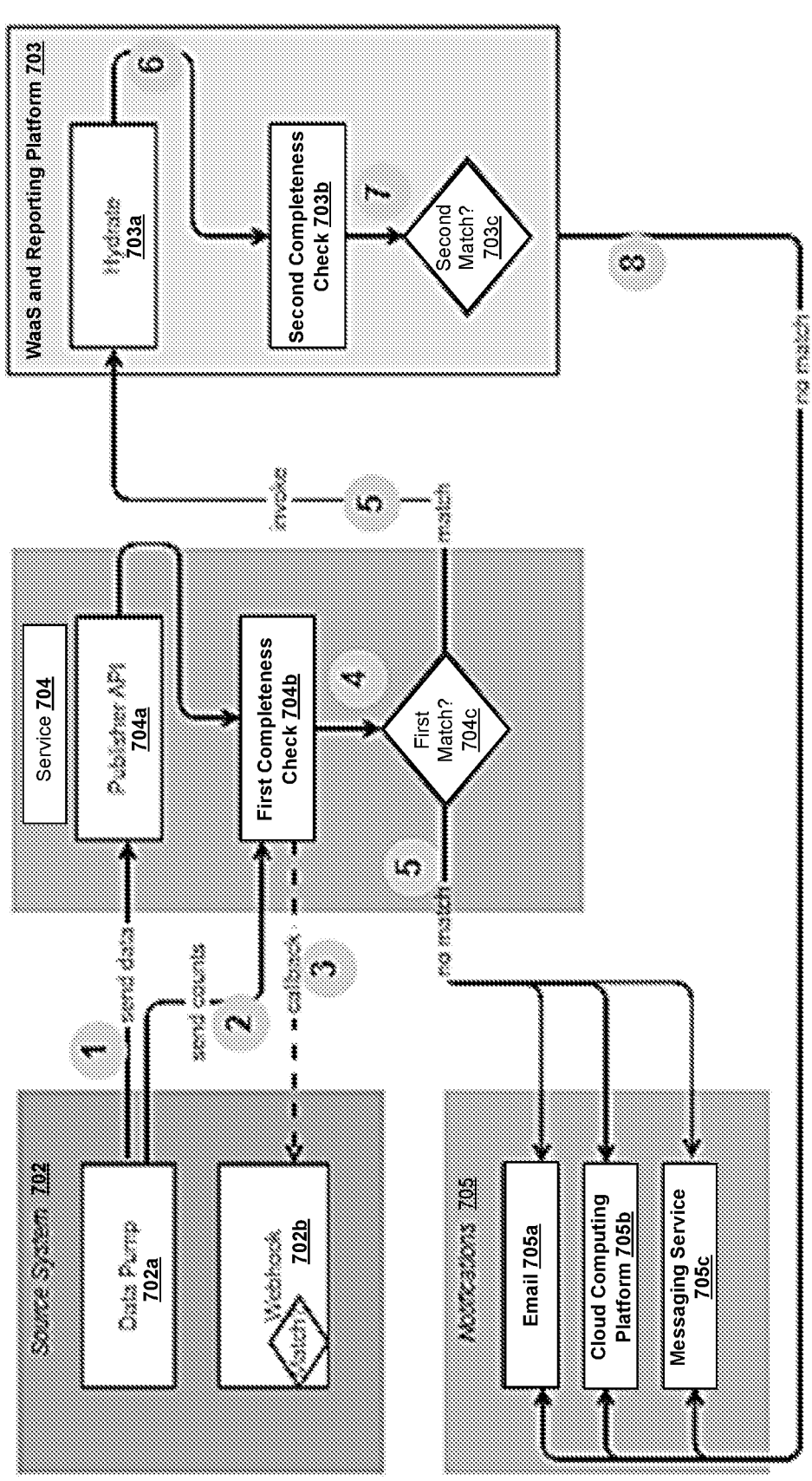
FIG. 7 illustrates an exemplary data flow diagram as implemented by the platform, language, database, and cloud agnostic model driven data platform module of FIG. 4 in accordance with an exemplary embodiment.

FIG. 7 illustrates an exemplary data flow diagram 700 as implemented by the platform, language, database, and cloud agnostic MDDPM 406 of FIG. 4 in accordance with an exemplary embodiment. As illustrated in FIG. 7, the data flow diagram 700 may include: a source system 702 that may include data pump 702a and Webhook 702b; a service 704 block that may include publisher API 704a block, a first completeness check 704b block, a first match 704c block; a WaaS and reporting platform 703 that may include hydrate 703a block, a second completeness check 703b block, and a second match 703c block; and notifications 705 block that may include email 705a block, a cloud computing platform 705b, and a messaging service 705c.

According to exemplary embodiments, data flow begins from data pump 702a which may receive data from a plurality of data sources (see, e.g., source 602 in FIG. 6). Data from the data pump 702a is published on a publisher block by calling the publisher API 704a. The first completeness check 704b block executes a process to check whether the published data on the publisher block within the service 704 is complete or not. When it is determined by the first completeness check 704b block that the data is not complete, the first completeness check 704b block executes a callback process to the Webhook 702b for data completion and the first match 704c block executes a matching algorithm utilizing the Webhook 702b to determine whether there is data match. When it is determined by the first match 704c block that there is no match, the data is sent to the notifications 705 block to notify and rectify the data by utilizing corresponding notifications channels, i.e., email 705a block, cloud computing platform 705b, and the messaging service 705c.

According to exemplary embodiments, when it is determined by the first match 704c block that there is data match, the hydrate 703a block executes data hydration, the second completeness check 703b block checks that the hydrated data is complete and the second match 703c block checks whether there is data match. Upon determining by the second match 703*c* block that there is data match, the WaaS and reporting platform 703 triggers an automated and dynamic process of data onboarding and reporting with no code or low code data warehouse. The report can be transmitted to a client. When it is determined by the second match 704*c* block that there is no match, the data is sent to the notifications 705 block to notify and rectify the data by utilizing corresponding notifications channels, i.e., email 705*a* block, cloud computing platform 705*b*, and the messaging service 705*c*.

Figure 8:
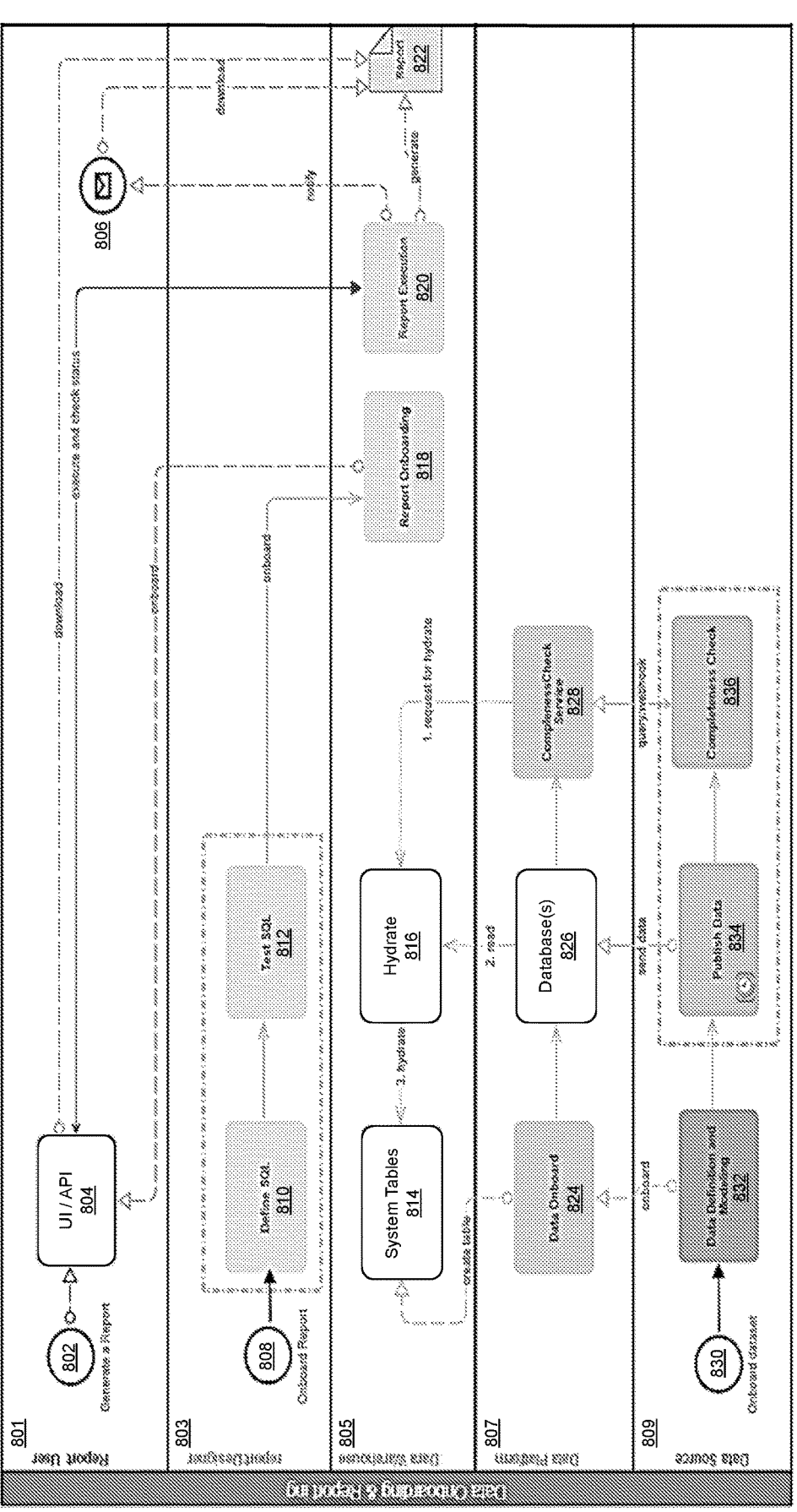
FIG. 8 illustrates an exemplary onboarding and reporting workflow as implemented by the platform, language, database, and cloud agnostic model driven data platform module of FIG. 4 for data mapping using a model in accordance with an exemplary embodiment.

FIG. 8 illustrates an exemplary onboarding and reporting workflow 800 as implemented by the platform, language, database, and cloud agnostic MDDPM 406 of FIG. 4 for data mapping using a model in accordance with an exemplary embodiment. As illustrated in FIG. 8, the exemplary onboarding and reporting workflow 800 may include a report user 801 block, a report designer 803 block, data warehouse 805, data platform 807, and data source 809.

According to exemplary embodiments, data flow begins from data source 809 and ends with report user 801 in the following exemplary manner. Data set 830 is onboarded onto data definition and modeling 832 block. Data from the data definition and modeling 832 block flows to data onboard 824 withing the data platform 807. Data from the data definition and modeling 832 block also flows to publish data 834 block which sends data for completeness check 836 block and the database(s) 826. Data may bidirectionally flow between the completeness check 836 block with the data service 809 and the completeness check service 828 within the data platform 807. The database(s) 826 may receive data from the data onboard 824 and sends to hydrate 816 and completeness check service 828. Data also flows from the data onboard 824 to the system tables. The system tables 814 may be generated from public cloud log files to provide a history of the system. These system tables 814 may be virtual system tables that may contain snapshots of the current system data based on data received from hydrate 816.

According to exemplary embodiments, onboard request 808 is being made by the report designer 803 upon which data flows from the define SQL 810 block to test SQL 812 block (both of which are implemented within the report designer 803 block) and then to report onboarding 818 block implemented within the data warehouse 805. SQL (Structured Query Language) is a domain-specific language used in programming and designed for managing data held in a relational database management system, or for stream processing in a relational data stream management system. A report 822 is generated using corresponding UI/API 804 and data received from the report onboarding 818 block by utilizing generate a report block 802. The report execution 820 block implemented within the data warehouse 805 executes and checks status of the report and sends notification to the report user 801 via email 806 or other communication channels disclosed herein.

According to exemplary embodiments, by implementing the data flow architecture and flow diagram as illustrated in FIGS. 6-8, the MDDPM 406 may be configured to trigger an automated and dynamic onboarding and reporting with no code or low code data warehouse process that may include, but not limited thereto, the following processes: implementing a model driven data warehouse as a service (WaaS) and reporting platform; establishing a communication link between the model driven data WaaS and reporting platform and a plurality of data source systems via a communication interface; receiving data from said plurality of data source systems; provisioning the data received from the plurality of source systems; validating the provisioned data; creating a machine learning data model based on the validated data; onboarding the data model onto the model driven data WaaS and reporting platform; generating an adapter pattern on every field type to treat it as a field, wherein the adapter pattern is generated where fields and their types are entered into data WaaS field types so that a user can define the field once and use across all reports thereby enabling no code approach; and dynamically generating a report corresponding to the adapter pattern for publication and consumption.

Figure 9:
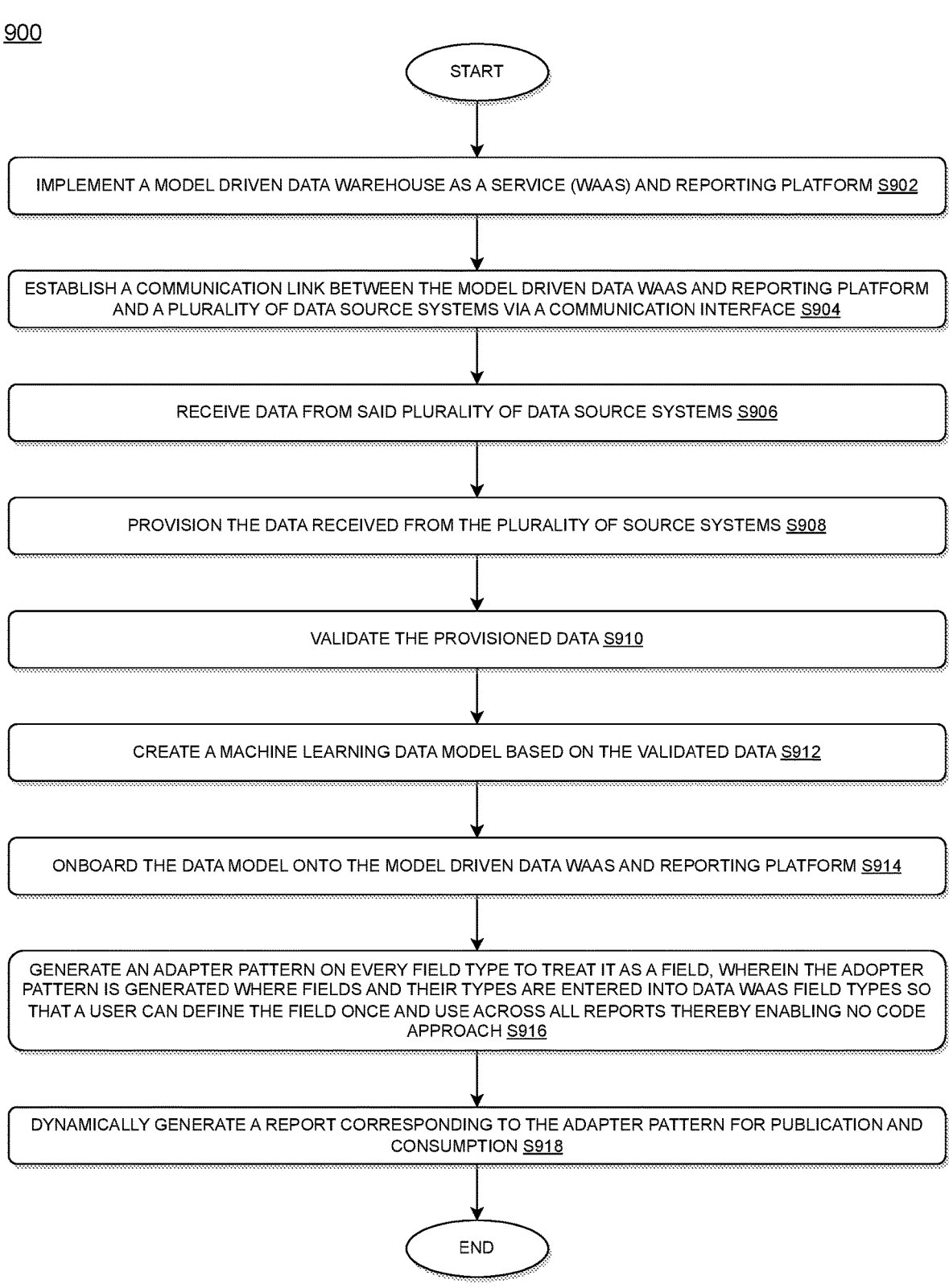
FIG. 9 illustrates an exemplary flow chart of a process implemented by the platform, language, database, and cloud agnostic model driven data platform module of FIG. 4 for systemically and dynamically onboarding and reporting data with no code or low code data warehouse in accordance with an exemplary embodiment.

FIG. 9 illustrates an exemplary flow chart of a process 900 implemented by the platform, language, database, and cloud agnostic MDDPM 409 of FIG. 4 for systemically and dynamically onboarding and reporting data with no code or low code data warehouse in accordance with an exemplary embodiment. It may be appreciated that the illustrated process 900 and associated steps may be performed in a different order, with illustrated steps omitted, with additional steps added, or with a combination of reordered, combined, omitted, or additional steps.

As illustrated in FIG. 9, at step S902, the process 900 may include implementing a model driven data WaaS and reporting platform.

At step S904, the process 900 may include establishing a communication link between the model driven data WaaS and reporting platform and a plurality of data source systems via a communication interface.

At step S906, the process 900 may include receiving data from said plurality of data source systems.

At step S908, the process 900 may include provisioning the data received from the plurality of source systems.

At step S910, the process 900 may include validating the provisioned data.

At step S912, the process 900 may include creating a machine learning data model based on the validated data.

At step S914, the process 900 may include onboarding the data model onto the model driven data WaaS and reporting platform.

At step S916, the process 900 may include generating an adapter pattern on every field type to treat it as a field. The adapter pattern is generated where fields and their types are entered into data WaaS field types so that a user can define the field once and use across all reports thereby enabling no code approach.

At step S918, the process 900 may include dynamically generating a report corresponding to the adapter pattern for publication and consumption.

According to exemplary embodiments, the process 900 may further include: generalizing the field by extracting common properties from the data within the data model, wherein the common properties include one or more of the following data: field identifier label, placeholder text, display order, and attribute that defines the number of columns a cell should span.

According to exemplary embodiments, the process 900 may further include: implementing the adapter pattern in a manner such that the model driven data WaaS and reporting platform implements low-code or no-code data pipeline and ingestion mechanisms for: generating platform managed data change history data; allowing point-in-time queries for audit and regulatory workloads; generating scalable, secure, cost effective and performant reports; sharing data for data science, analytics and reporting all from a single platform as provided by the model driven data WaaS and reporting platform.

According to exemplary embodiments, the process 900 may further include: implementing role based access control mechanisms; and providing access to the report according to user's role.

According to exemplary embodiments, the process 900 may further include: generating a dynamic reporting application programming interface; and downloading the report by utilizing the dynamic reporting application programming interface.

According to exemplary embodiments, the process 900 may further include: generating a dynamic reporting user interface; and downloading the report by utilizing the dynamic reporting user interface.

According to exemplary embodiments, the process 900 may further include: maintaining, upon onboarding the data model, data change history to any dataset by the model driven data platform module without any effort from data producers.

According to exemplary embodiments, the process 900 may further include: creating corresponding field type at runtime utilizing the adapter pattern.

Figure 10:
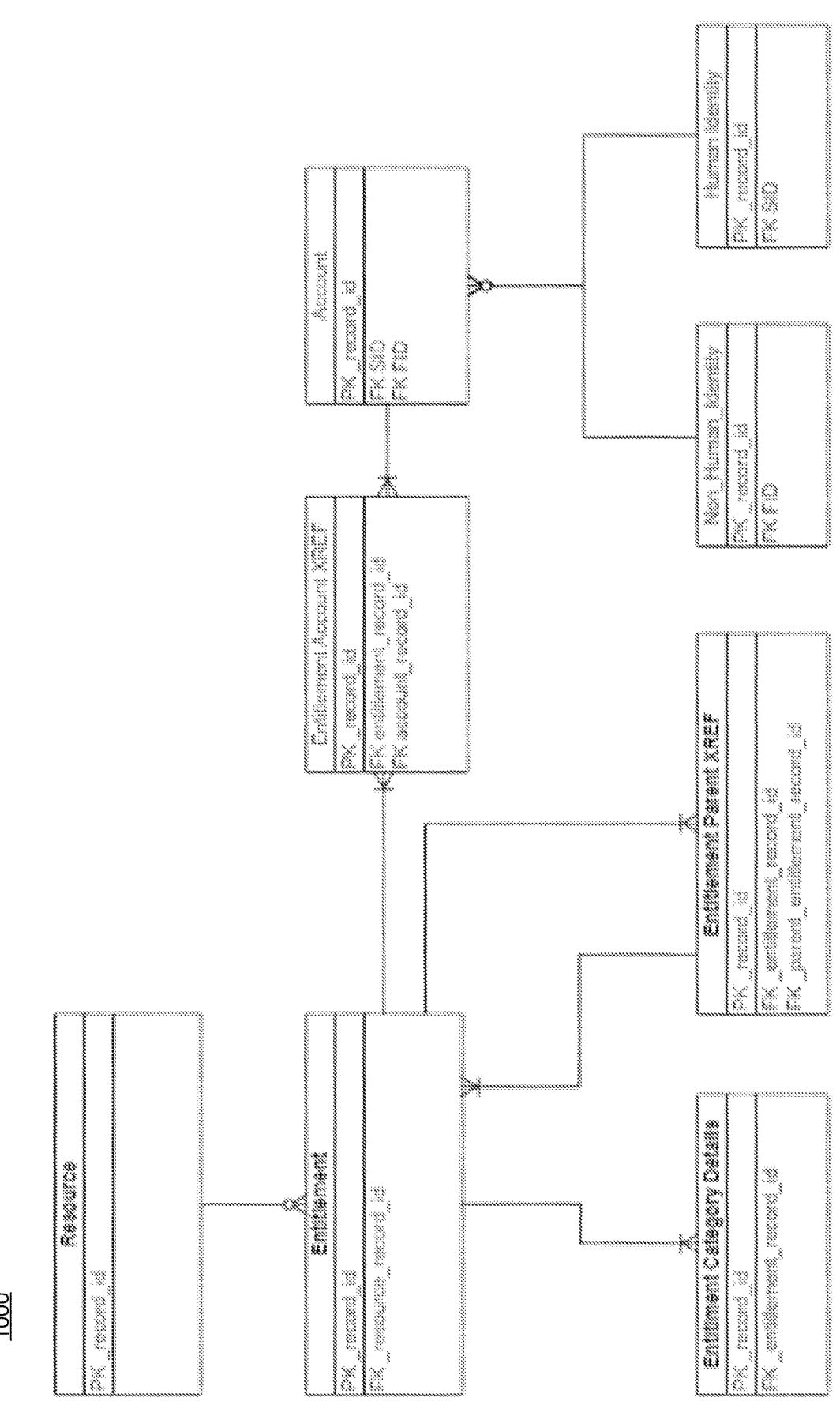
FIG. 10 illustrates an exemplary data model as implemented by the platform, language, database, and cloud agnostic model driven data platform module of FIG. 4 in accordance with an exemplary embodiment.

FIG. 10 illustrates an exemplary data model 1000 as implemented by the platform, language, database, and cloud agnostic MDDPM 406 of FIG. 4 in accordance with an exemplary embodiment. Once a report generation request is created and approved, next step is to fulfill the request, which is provisioning the entitlements to identity. According to exemplary embodiments, provisioning systems may change. However, the underlying information needed for provisioning remains constant. That is, for definition: identity (who); account (assumed as who); and resource (what resource); and entitlement (what entitlements). During execution, it is also determined who is granted access to what entitlements on which resource on xyz date. For example, as illustrated in the exemplary data model 1000, the entity relationship overview is presented for resource, entitlement, entitlement account, account, entitlement category details, entitlement parent, non-human identity, and human identity, etc., but the disclosure is not limited thereto.

According to exemplary embodiments, the MDDPD 402 may include a memory (e.g., a memory 106 as illustrated in FIG. 1) which may be a non-transitory computer readable medium that may be configured to store instructions for implementing a platform, language, database, and cloud agnostic MDDPM 406 for systemically and dynamically onboarding and reporting data with no code or low code data warehouse as disclosed herein. The MDDPD 402 may also include a medium reader (e.g., a medium reader 112 as illustrated in FIG. 1) which may be configured to read any one or more sets of instructions, e.g., software, from any of the memories described herein. The instructions, when executed by a processor embedded within the MDDPM 406 or within the MDDPD 402, may be used to perform one or more of the methods and processes as described herein. In a particular embodiment, the instructions may reside completely, or at least partially, within the memory 106, the medium reader 112, and/or the processor 104 (see FIG. 1) during execution by the MDDPD 402.

According to exemplary embodiments, the instructions, when executed, may cause a processor embedded within the MDDPM 406 or the MDDPD 402 to perform the following: implementing a model driven data WaaS and reporting platform; establishing a communication link between the model driven data WaaS and reporting platform and a plurality of data source systems via a communication interface; receiving data from said plurality of data source systems; provisioning the data received from the plurality of source systems; validating the provisioned data; creating a machine learning data model based on the validated data; onboarding the data model onto the model driven data WaaS and reporting platform; generating an adapter pattern on every field type to treat it as a field, wherein the adapter pattern is generated where fields and their types are entered into data WaaS field types so that a user can define the field once and use across all reports thereby enabling no code approach; and dynamically generating a report corresponding to the adapter pattern for publication and consumption.

According to exemplary embodiments, the processor may be the same or similar to the processor 104 as illustrated in FIG. 1 or the processor embedded within the MDDPD 202, MDDPD 302, MDDPD 402, and MDDPM 406 which is the same or similar to the processor 104.

According to exemplary embodiments, the instructions, when executed, may cause the processor 104 to further perform the following: generalizing the field by extracting common properties from the data within the data model, wherein the common properties include one or more of the following data: field identifier label, placeholder text, display order, and attribute that defines the number of columns a cell should span.

According to exemplary embodiments, the instructions, when executed, may cause the processor 104 to further perform the following: implementing the adapter pattern in a manner such that the model driven data WaaS and reporting platform implements low-code or no-code data pipeline and ingestion mechanisms for: generating platform managed data change history data; allowing point-in-time queries for audit and regulatory workloads; generating scalable, secure, cost effective and performant reports; sharing data for data science, analytics and reporting all from a single platform as provided by the model driven data WaaS and reporting platform.

According to exemplary embodiments, the instructions, when executed, may cause the processor 104 to further perform the following: implementing role based access control mechanisms; and providing access to the report according to user's role.

According to exemplary embodiments, the instructions, when executed, may cause the processor 104 to further perform the following: generating a dynamic reporting application programming interface; and downloading the report by utilizing the dynamic reporting application programming interface.

According to exemplary embodiments, the instructions, when executed, may cause the processor 104 to further perform the following: generating a dynamic reporting user interface; and downloading the report by utilizing the dynamic reporting user interface.

According to exemplary embodiments, the instructions, when executed, may cause the processor 104 to further perform the following: maintaining, upon onboarding the data model, data change history to any dataset by the model driven data platform module without any effort from data producers.

According to exemplary embodiments, the instructions, when executed, may cause the processor 104 to further perform the following: creating corresponding field type at runtime utilizing the adapter pattern.

According to exemplary embodiments as disclosed above in FIGS. 1-9, technical improvements effected by the instant disclosure may include a platform for implementing a platform, language, database, and cloud agnostic model driven data platform module configured to systemically and dynamically: onboard modeled data into a data WaaS platform; implement pattern driven low/no-code data pipeline and ingestion mechanisms; generate platform managed data change history data; allow point-in-time queries for audit and regulatory workloads; generate scalable, secure, cost effective and performant reports; allow sharing data for data science, analytics and reporting, etc., create a single platform for accessing and consuming historical view of all IAM data (e.g., audit, analytics, etc.), but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for data onboarding and reporting with no code or low code data warehouse by utilizing one or more processors along with allocated memory, the method comprising:

implementing a model driven data platform module (MDDPM), by a model driven data platform device, that includes an implementing module, a receiving module, a provisioning module, a validating module, a creating module, an onboarding module, a generating module, and a communication module, wherein each module being called via a corresponding Application Programming Interface (API), and wherein the MDDPM is configured to trigger an automated and dynamic onboarding and reporting with no code or low code data warehouse process that includes:

implementing, by calling the implementing module, a model driven data warehouse as a service (WaaS) and reporting platform;

establishing a communication link, by calling the communication module, between the model driven data WaaS and reporting platform and a plurality of data source systems via a communication interface;

receiving, by calling the receiving module, data from said plurality of data source systems;

implementing, by calling the implementing module, an architecture that includes a data streaming account including a publisher API, a managed stream processing platform, a stream processor, a primary database, and a failed message database, wherein the data streaming account utilizes the publisher API to publish the data onto a publishing platform;

authenticating and authorizing the data for processing and saving onto the managed stream processing platform;

transmitting the authenticated and authorized data from the managed stream processing platform to the stream processor where the data is further processed for data payload and schema validation and persisted to the primary database, wherein invalid data from the stream processor is stored onto the failed messages database for further validation processing;

provisioning, by calling the provisioning module, the data received from the stream processor;

validating, by calling the validating module, the provisioned data;

creating, by calling the creating module, a machine learning data model based on the validated data;

onboarding, by calling the onboarding module, the machine learning data model onto the model driven data WaaS and reporting platform;

extracting, via the MDDPM, common properties from the data within the machine learning data model, the common properties comprising at least a field identifier label, placeholder text, display order, and an attribute defining a number of columns a cell should span;

generating, by calling the generating module, an adapter pattern on every field type to treat it as a field, wherein the adapter pattern is configured such that a user can define the field once and reuse the field across all reports, thereby enabling a no-code reporting approach;

creating, by calling the creating module, corresponding field type at runtime utilizing the adapter pattern;

implementing the adapter pattern in a manner such that the model driven data WaaS and reporting platform implements low-code or no-code data pipeline and ingestion mechanisms for: generating platform managed data change history data; allowing point-in-time queries for audit and regulatory workloads; generating scalable, secure, cost effective and performant reports; sharing data for data science, analytics and reporting all from a single platform as provided by the model driven data WaaS and reporting platform; and dynamically generating, by calling the generating module, a report corresponding to the adapter pattern for publication and consumption, the report being downloadable via a dynamic reporting user interface or dynamic reporting API.

2. The method according to claim 1, further comprising: generalizing the field by extracting the common properties from the data within the machine learning data model, wherein the common properties include field identifier label, placeholder text, display order, and attribute that defines the number of columns a cell should span.

3. The method according to claim 1, further comprising: implementing role based access control mechanisms; and providing access to the report according to user's role.

4. The method according to claim 1, further comprising: generating a dynamic reporting application programming interface; and downloading the report by utilizing the dynamic reporting application programming interface.

5. The method according to claim 1, further comprising: generating a dynamic reporting user interface; and downloading the report by utilizing the dynamic reporting user interface.

6. The method according to claim 1, further comprising: maintaining, upon onboarding the machine learning data model, data change history to any dataset by a model driven data platform module without any effort from data producers.

7. A system for data onboarding and reporting with no code or low code data warehouse, the system comprising: a processor; and a memory operatively connected to the processor via a communication interface, the memory storing computer readable instructions, when executed, causes the processor to:

implement a model driven data platform module (MDDPM), by a model driven data platform device, that includes an implementing module, a receiving module, a provisioning module, a validating module, a creating module, an onboarding module, a generating module, and a communication module, wherein each module being called via a corresponding Application Programming Interface (API), and wherein the MDDPM is configured to trigger an automated and dynamic onboarding and reporting with no code or low code data warehouse process that includes:

implement, by calling the implementing module, a model driven data warehouse as a service (WaaS) and reporting platform;

establish a communication link, by calling the communication module, between the model driven data WaaS and reporting platform and a plurality of data source systems via a communication interface;

receive, by calling the receiving module, data from said plurality of data source systems;

implement, by calling the implementing module, an architecture that includes a data streaming account including a publisher API, a managed stream processing platform, a stream processor, a primary database, and a failed message database, wherein the data streaming account utilizes the publisher API to publish the data onto a publishing platform;

authenticate and authorize the data for processing and saving onto the managed stream processing platform;

transmit the authenticated and authorized data from the managed stream processing platform to the stream processor where the data is further processed for data payload and schema validation and persisted to the primary database, wherein invalid data from the stream processor is stored onto the failed messages database for further validation processing;

provision, by calling the provisioning module, the data received from the stream processor;

validate, by calling the validating module, the provisioned data;

create, by calling the creating module, a machine learning data model based on the validated data;

onboard, by calling the onboarding module, the machine learning data model onto the model driven data WaaS and reporting platform;

extract, via the MDDPM, common properties from the data within the machine learning data model, the common properties comprising at least a field identifier label, placeholder text, display order, and an attribute defining a number of columns a cell should span;

generate, by calling the generating module, an adapter pattern on every field type to treat it as a field, wherein the adapter pattern is configured such that a user can define the field once and reuse the field across all reports, thereby enabling a no-code reporting approach;

create, by calling the creating module, corresponding field type at runtime utilizing the adapter pattern;

implement the adapter pattern in a manner such that the model driven data WaaS and reporting platform implements low-code or no-code data pipeline and ingestion mechanisms for: generating platform managed data change history data; allowing point-in-time queries for audit and regulatory workloads; generating scalable, secure, cost effective and performant reports; sharing data for data science, analytics and reporting all from a single platform as provided by the model driven data WaaS and reporting platform; and dynamically generate, by calling the generating module, a report corresponding to the adapter pattern for publication and consumption, the report being downloadable via a dynamic reporting user interface or dynamic reporting API.

8. The system according to claim 7, wherein the processor is further configured to:

generalize the field by extracting the common properties from the data within the machine learning data model, wherein the common properties include field identifier label, placeholder text, display order, and attribute that defines the number of columns a cell should span.

9. The system according to claim 7, wherein the processor is further configured to:

implement role based access control mechanisms; and provide access to the report according to user's role.

10. The system according to claim 7, wherein the processor is further configured to:

generate a dynamic reporting application programming interface; and download the report by utilizing the dynamic reporting application programming interface.

11. The system according to claim 7, wherein the processor is further configured to:

generate a dynamic reporting user interface; and download the report by utilizing the dynamic reporting user interface.

12. The system according to claim 7, wherein the processor is further configured to:

maintain, upon onboarding the machine learning data model, data change history to any dataset by a model driven data platform module without any effort from data producers.

13. A non-transitory computer readable medium configured to store instructions for data onboarding and reporting with no code or low code data warehouse, the instructions, when executed, cause a processor to perform the following:

implementing a model driven data platform module (MDDPM), by a model driven data platform device, that includes an implementing module, a receiving module, a provisioning module, a validating module, a creating module, an onboarding module, a generating module, and a communication module, wherein each module being called via a corresponding Application Programming Interface (API), and wherein the MDDPM is configured to trigger an automated and dynamic onboarding and reporting with no code or low code data warehouse process that includes:

implementing, by calling the implementing module, a model driven data warehouse as a service (WaaS) and reporting platform;

establishing a communication link, by calling the communication module, between the model driven data WaaS and reporting platform and a plurality of data source systems via a communication interface;

receiving, by calling the receiving module, data from said plurality of data source systems;

implementing, by calling the implementing module, an architecture that includes a data streaming account including a publisher API, a managed stream processing platform, a stream processor, a primary database, and a failed message database, wherein the data streaming account utilizes the publisher API to publish the data onto a publishing platform;

authenticating and authorizing the data for processing and saving onto the managed stream processing platform;

transmitting the authenticated and authorized data from the managed stream processing platform to the stream processor where the data is further processed for data payload and schema validation and persisted to the primary database, wherein invalid data from the stream processor is stored onto the failed messages database for further validation processing;

provisioning, by calling the provisioning module, the data received from the stream processor;

validating, by calling the validating module, the provisioned data;

creating, by calling the creating module, a machine learning data model based on the validated data;

onboarding, by calling the onboarding module, the machine learning data model onto the model driven data WaaS and reporting platform;

extracting, via the MDDPM, common properties from the data within the machine learning data model, the common properties comprising at least a field identifier label, placeholder text, display order, and an attribute defining a number of columns a cell should span;

generating, by calling the generating module, an adapter pattern on every field type to treat it as a field, wherein the adapter pattern is configured such that a user can define the field once and reuse the field across all reports, thereby enabling a no-code reporting approach;

creating, by calling the creating module, corresponding field type at runtime utilizing the adapter pattern;

implementing the adapter pattern in a manner such that the model driven data WaaS and reporting platform implements low-code or no-code data pipeline and ingestion mechanisms for: generating platform managed data change history data; allowing point-in-time queries for audit and regulatory workloads; generating scalable, secure, cost effective and performant reports; sharing data for data science, analytics and reporting all from a single platform as provided by the model driven data WaaS and reporting platform; and dynamically generating, by calling the generating module, a report corresponding to the adapter pattern for publication and consumption, the report being downloadable via a dynamic reporting user interface or dynamic reporting API.

14. The non-transitory computer readable medium according to claim 13, wherein the instructions, when executed, cause the processor to further perform the following:

generalizing the field by extracting the common properties from the data within the machine learning data model, wherein the common properties include field identifier label, placeholder text, display order, and attribute that defines the number of columns a cell should span.

15. The non-transitory computer readable medium according to claim 6, wherein the instructions, when executed, cause the processor to further perform the following:

implementing role based access control mechanisms; and providing access to the report according to user's role.

16. The non-transitory computer readable medium according to claim 13, wherein the instructions, when executed, cause the processor to further perform the following:

generating a dynamic reporting application programming interface; and downloading the report by utilizing the dynamic reporting application programming interface.

17. The non-transitory computer readable medium according to claim 13, wherein the instructions, when executed, cause the processor to further perform the following:

generating a dynamic reporting user interface; and downloading the report by utilizing the dynamic reporting user interface.

18. The non-transitory computer readable medium according to claim 13, wherein the instructions, when executed, cause the processor to further perform the following:

maintaining, upon onboarding the machine learning data model, data change history to any dataset by a model driven data platform module without any effort from data producers.

\* \* \* \* \*